(12) United States Patent
Gustafsson

(10) Patent No.: US 8,704,681 B2
(45) Date of Patent: Apr. 22, 2014

(54) ARRANGEMENT AND METHOD FOR CROSS-MONITORING OF DATA

(75) Inventor: Anna Gustafsson, Linköping (SE)

(73) Assignee: SAAB AB, Linköping (SE)

( * ) Notice: Subject to any disclaimer, the term of this patent is extended or adjusted under 35 U.S.C. 154(b) by 1500 days.

(21) Appl. No.: 12/076,353

(22) Filed: Mar. 17, 2008

(65) Prior Publication Data

US 2008/0313248 A1    Dec. 18, 2008

(30) Foreign Application Priority Data

Mar. 15, 2007   (EP) ..................................... 07104282

(51) Int. Cl.
    *G08B 21/00*   (2006.01)
(52) U.S. Cl.
    USPC ........... 340/945; 340/982; 340/980; 340/971; 701/120
(58) Field of Classification Search
    USPC ....................................................... 340/945
    See application file for complete search history.

(56) References Cited

U.S. PATENT DOCUMENTS

| | | | | |
|---|---|---|---|---|
| 4,622,667 A | * | 11/1986 | Yount | 714/11 |
| 5,710,776 A | * | 1/1998 | Tomlinson et al. | 714/704 |
| 2004/0216000 A1 | | 10/2004 | Koehler et al. | |

FOREIGN PATENT DOCUMENTS

DE    10333323 A1    1/2004

OTHER PUBLICATIONS

European Search Report—Feb. 29, 2008.

* cited by examiner

*Primary Examiner* — George Bugg
*Assistant Examiner* — Anthony D Afrifa-Kyei
(74) *Attorney, Agent, or Firm* — Venable LLP; Eric J. Franklin

(57) ABSTRACT

An arrangement for cross monitoring two independent signals. The arrangement a calculator configured to calculate a value depending upon a signal value, a drift value and a feedback value, and a determining unit configured to determine a larger of the calculated value and a first predetermined value. The arrangement also includes a comparing unit configured to compared the determine larger value with a second predetermined value and a delaying unit configured to delay the determined larger value and change status of the larger value to become an updated feedback value to be provided to the calculator. The arrangement is characterized in that the signal value includes information about an absolute value of a difference between the two independent generated signals.

29 Claims, 10 Drawing Sheets

ARRANGEMENT AND METHOD FOR CROSS-MONITORING OF DATA

CROSS-REFERENCE TO RELATED APPLICATIONS

This application claims priority to European patent application 07104282.4 filed 15 Mar. 2007.

TECHNICAL FIELD

The invention relates in general to cross-monitoring of data. In particular the invention relates to an arrangement for cross-monitoring of data provided within a platform.

The invention also relates to a method for cross-monitoring of data. In particular the invention relates to a method for cross-monitoring of data provided within a platform. Furthermore, the invention relates to software adapted to perform steps of the data cross-monitoring method, when executed on a computer.

BACKGROUND OF THE INVENTION

Today it is of outmost importance to present correct flight safety critical primary data, such as altitude or roll angle, to an operator of a platform, e.g. a pilot of an aircraft. In aircrafts there are often at least two independent systems provided for generating flight safety critical primary data. Data generated by the two independent systems have to be checked so as to detect any malfunction of sensors of respective system results in false or deviating flight safety critical primary data.

Manual cross-monitoring of flight critical primary data performed by the operator of the platform involves high work load. Also, a stressed or tired operator may more often make incorrect judgements. In airplanes, for example, flight safety critical primary data to be cross-monitored are presented on different display surfaces in cockpit, occupying unnecessary presentation surface area.

Another way of controlling important data generated by separate independent sources is voting. The procedure of automatic voting relates to a system of triple redundant sources meaning that three separate independent sources are used, each generating unique data to be compared. According to one known procedure, the data among the three, which deviates the most, is voted down. This system is bulky, heavy and costly.

U.S. Pat. No. 4,622,667 depicts an automatic flight control system that is fail operational with respect to a generic fault. The automatic flight control system utilizes at least two independent flight control subsystems, each comprising a pair of channels. One channel in each subsystem includes a first digital data processor and the other channel includes a second digital data processor with an active third processor. The two channels in each subsystems are cross-channel monitored to detect disagreements between the outputs of the first and second processors and the outputs of the first and third processors. This system also suffers from the disadvantage of being bulky and costly.

It therefore exist a need to provide means arranged to facilitate the process of cross-monitoring of primary flight parameter data within a platform, such as an airplane.

SUMMARY OF THE INVENTION

An object according to an aspect of present invention is to provide an improved arrangement and method for cross-monitoring of data.

An object according to an aspect of the present invention is to provide an arrangement and method reducing false detection of erroneous sensors of a platform.

Above mentioned problems are solved by an arrangement for cross monitoring two independent signals, comprising:
means for calculating a value depending upon a signal value, drift value and a feedback value;
means for determining a larger one of the calculated value and a first predetermined value;
means for comparing said determined larger value with a second predetermined value;
means for delaying said determined larger value and change status of said larger value to become an updated feedback value to be provided to the means for calculating the value.
The arrangement is characterized in that the signal value comprises information about an absolute value of a difference between the two independent generated signals.

Preferably the means for comparing said determined larger value with a second predetermined value is arranged to output a warning signal if said determined larger value is equal or larger than the second predetermined value.

Preferably the means for determining a larger one of the calculated value and the first predetermined value further is arranged to limit the determined larger value of the calculated value and the first predetermined value to a predetermined value.

Preferably means for selecting a phase of looping the updated feedback value is arranged to receive the updated feedback value from the delaying means and to receive the determined larger value from the determining means.

Preferably the second predetermined value is depending upon a preset constant time, preset constant frequency, and a difference of a parameter value and drift value.

Preferably the second predetermined value is a threshold value which value is depending upon different platform modes, such as starting mode or landing mode.

Preferably the drift value is a predetermined design parameter value.

Preferably means for calculating the absolute value of the difference between the two independent signals is arranged to input the calculated absolute value to the means for calculating the value.

Preferably each of the two independent signals is generated by a separate independent sensor.

Preferably said first and second signal comprises substantially simultaneously measured values relating to one operating parameter.

Preferably the operating parameter is chosen from a group comprising altitude (A) of a platform, calibrated airspeed (CV) of a platform, speed (MS) of a platform measured in Mach, pitch value TV of a (platform), roll value (RV) of a platform, true heading (TH) of a platform and magnetic course (MC) of a platform.

According to an aspect of the invention a platform comprises an arrangement as depicted above, wherein the platform is chosen from a group comprising airplane, space craft, satellite, helicopter, robot, missile or ground vehicle, water craft or underwater craft, e.g. an automobile, ship or submarine.

The problems are also solved by a method for cross monitoring two independent signals within a platform, comprising the steps of:
calculating a value depending upon a signal value, drift value and a feedback value;
determining a larger one of the calculated value and a first predetermined value;

comparing said determined larger value with a second predetermined value;

delaying said determined larger value and change status of said larger value to become an updated feedback value to be used is a next calculation step of the value, wherein the method also comprises the step of:

calculating the signal value depending upon an absolute value of the difference between the two independent signals.

Preferably there is provided a computer programme comprising a programme code for performing the method steps depicted above, when said computer programme is run on a computer.

Preferably there is provided computer programme product comprising a program code stored on a computer readable media for performing the method steps depicted above, when said computer programme is run on the computer.

Preferably there is provided computer programme product directly storable in an internal memory of a computer, comprising a computer programme for performing the method steps depicted above, when said computer programme is run on the computer.

One positive outcome of the arrangement according to the invention is that a more reliable cross-monitoring process concerning important flight parameter data is achieved. An operator of the platform may herewith experience a reduced stress when being supported with an arrangement which minimizes the number of false alarms regarding failing sensors of flight parameter data.

The present invention further provides an improved cross-monitoring procedure, which allows to triggering an alarm associated with predetermined limits relating to a maximum allowed flight parameter data deviation and time. Also, suppression of system noise is very efficient and thereby false detection of sensor signal deviation is minimised.

A beneficial contribution of the invention is that an indication of detection of flight parameter data deviation is allowed to self-heal if the arrangement again can prove a correct behaviour.

Yet another beneficial contribution of the invention is that the cross-monitoring of flight parameter data is performed regarding two variable signals instead of one. This gives that the absolute value of the signal difference is used as one input signal for the algorithm according to the invention and thus provides the advantage of performing cross-monitoring of both sources simultaneously.

Additional objects, advantages and novel features of the present invention will become apparent to those skilled in the art from the following details, as well as by practice of the invention. While the invention is described below, it should be understood that the invention is not limited to the specific details disclosed. A person skilled in the art having access to the teachings herein will recognise additional applications, modifications and embodiments in other fields, which are within the scope of the invention.

BRIEF DESCRIPTION OF THE DRAWINGS

For a more complete understanding of the present invention and further objects and advantages thereof, reference is now made to the examples shown in the accompanying drawings, in which.

DETAILED DESCRIPTION OF THE DRAWINGS

Figure 1A:
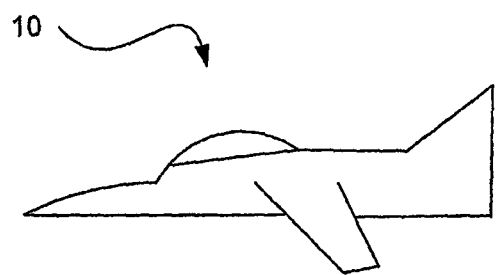
FIG. 1a schematically illustrates a platform according to an aspect of the present invention.

With reference to FIG. 1a a platform 10 is schematically shown. The platform may be an airplane, such as a passenger traffic airplane. Alternatively the airplane can be a military aircraft, such as a fighter, bomber, reconnaissance airplane, or a combination thereof. The platform may also be an autonomous platform, such as an unmanned aerial vehicle (UAV). The autonomous platform can also be any kind of a helicopter, robot or missile.

Herein, for sake of simplicity, the arrangement and method for cross-monitoring of data according to the invention is depicted for the case of the platform being an airplane controlled by a pilot. However, various different applications of the application are possible, e.g. for use of remote controlled vehicles such as small surveillance helicopters.

It should be noted that the arrangement and method according to the invention depicted herein may be utilized in applications where a pair of equivalent sensors are arranged to measure relevant parameters, such as flow indicating parameters or other.

It should also be noted that the platform 10 alternatively can be a ground vehicle, water craft or underwater craft, e.g. an automobile, ship or submarine. Alternatively, the platform 10 can be a space craft or a satellite. The platform 10 comprises a sub-system, which is depicted in greater detail below with reference to FIG. 1b.

Hereinafter the term "link" refers to a communication link which may be a physical connector, such as an optoelectronic communication wire, or a non-physical connector such as a wireless connection, for example a radio or microwave link.

Figure 1B:
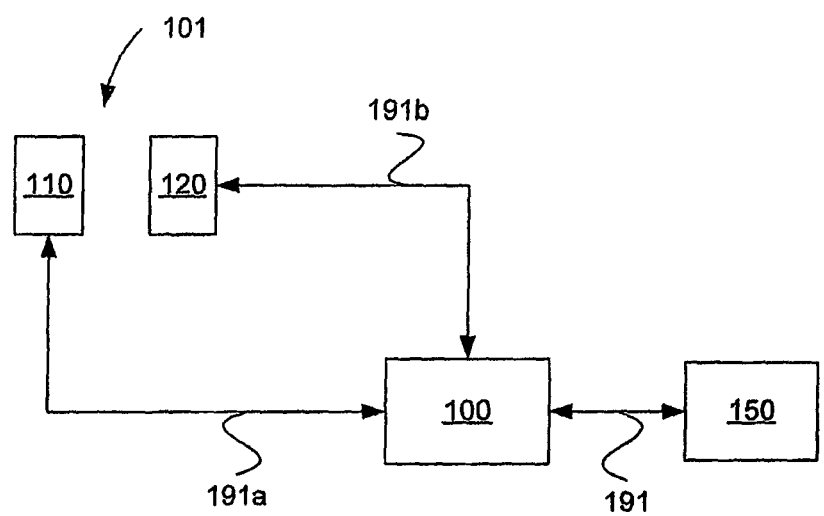
FIG. 1b schematically illustrates a sub-system of the platform of FIG 1a according to an aspect of the present invention.

FIG. 1b schematically illustrates the above mentioned sub-system of the platform 10.

The data processing device 100 is connected to a set of sensors 101. The set of sensors 101 comprises two mutually equivalent sensors 110 and 120, e.g. sensors for measuring altitude A. An example of a sensor type of this kind is a pressure altimeter or a radio altimeter. The processing device 100 is further arranged for communication with a communication terminal 150.

The set of sensors 101 may in practice comprise a plurality of different sensor pairs. The number of sensor pairs may be an arbitrary number. Each sensor of the set of sensors 101 is arranged to detect and/or measure one parameter.

According to another embodiment each sensor of the set of sensors is arranged to measure at least one flight data parameter. According to a preferred embodiment of the invention flight data parameters of interest are so called primary data. In particular flight data parameters of interest are so called critical primary data.

Examples of flight data parameters which can be used in accordance with the invention are: altitude A of the platform, calibrated airspeed CV of the platform, speed MS of the platform measured in Mach, pitch value TV of the platform, roll value RV of the platform, true heading TH of the platform and magnetic course MC of the platform.

General Description of an Algorithm According to an Aspect of the Invention

A modified CUSUM (algorithm), which is used according to the invention, is given as:

$$g(t)=\text{Max}(g(t-1)+s(t)-v,0)$$

if g(t)>h, then a the arrangement according to the invention triggers an alarm indicating that corresponding flight data parameters differs too much from each other relative a predetermined criterion,
where
Max(g(t−1)+s(t)−v,0) is a max function returning the larger of values (g(t−1)+s(t)−v) or 0, and where
g(t):test statistics;
s(t): absolute value of signal difference, i.e. |Signal1−Signal2|;
v: drift. v is a design parameter, which determines the amount of system noise which should be suppressed in relation to a sensitivity of sensor deviation warning;
h: threshold value;
where h is expressed as a function of v:

$$h=tl \cdot f(I-v)$$

where,
I: maximum accepted deviation between corresponding values of a pair of flight data parameter values provided by the two sensors 110 and 120, respectively. The parameter I is a design parameter and can thus be set to different values depending upon different flight situations.
tl: maximum accepted time (seconds) of deviation between monitored signals;
f: calculation frequency.

Also the expression (g(t−1)+s(t)−v) is hereinafter referred to as y(t) or simply y.

An arbitrary frequency f can be used. A predetermined frequency can be used. Calculation frequency f is a design parameter. According to an embodiment of the invention the used frequency is in the interval 0,001-1 GHz. According to an embodiment of the invention the used frequency is in the interval 1-100 Hz. According to an embodiment of the invention the used frequency is in the interval 1-100 Hz. Preferably the used frequency is 7,5 Hz. It should however be noted that the arrangement according to the invention could be realized with analogue technology.

An arbitrary maximum accepted time of deviation tl can be used. A predetermined maximum accepted time of deviation tl can be used. Maximum accepted time of deviation tl is a design parameter. According to an embodiment of the invention the used maximum accepted time of deviation tl is in the interval 1 micro second to 5 hours. According to an embodiment of the invention the used maximum accepted time of deviation tl is in the interval 1-60 seconds. According to an embodiment of the invention the used maximum accepted time of deviation tl is in the interval 5-20 seconds. Preferably the maximum accepted time of deviation tl is 15 seconds.

An arbitrary maximum accepted deviation between corresponding values of a pair of flight data parameter values I can be used. A predetermined maximum accepted deviation between corresponding values of a pair of flight data parameter values I can be used. Maximum accepted deviation between corresponding to a pair of a given flight data parameter values I is a design parameter.

Calculation Example One, Calculation of the Parameter h

Case 1: tl=10 s, f=7,5 Hz, I=20, v=10 ⇒ h=750

This case could be associated with a situation wherein tl and I are chosen for flying at low altitudes. Increased risk decreases tl and I. In this specific case, system noise is assumed to be fairly low why v is chosen to be half the size of 1.

Case 2: tl=10 s, f=7,5 Hz, I=20, v=19,9 ⇒ h=7,5

This case could be associated with a situation wherein tl and I are chosen for flying at low altitudes. Increased risk decreases tl and I. In this specific case, system noise is assumed to be near 1 due to for example turbulence and is therefore chosen close to I. The choice of v in this case makes the system more sensitive to difference in compared signals, but efficiently suppresses system noise.

End of calculation example one.

The test statistics g(t) is according to an embodiment only increased when the absolute signal difference s(t) exceeds the value of the drift v. When the sum exceeds the value of the threshold value h a warning signal is generated according to an aspect of the invention.

The time before the sum g(t) reaches the threshold value h and warns is depending upon the absolute signal difference s(t), drift v and threshold value h. The modified CUSUM reacts faster the larger the value of the absolute signal difference is. The drift v decides the allowed deviation of the absolute signal difference within the algorithm. The drift v can be chosen close to the value of the maximum accepted deviation (I) for the flight data parameter of choice to suppress most signal noise and give quick response if an error occurs. The smaller the value of the drift v is chosen, the more sensitive the algorithm is for the signal noise and errors. The algorithm will however have a slower response due to larger threshold value h. The threshold value h is dependent on the drift (v), allowed time (tl) and maximum accepted deviation (I).

According to an aspect of the invention the algorithm is a modified CUSUM which is adapted for cross-monitoring of primary flight data, such as critical primary data.

Second Calculation Example, Altitude, Summation

Given: The first signal s1 and s2, generated by the sensors 110 and 120, respectively, may differ maximum 10 meter during a time period of 10 seconds.
The frequency f is set to f=10 Hz.
s1=10, s2=20

$$v=5 \text{ m}; h=tl \cdot f(I-v)=10*10(10-5)=500$$

First sample: |s1−s2|=10=s(t), $$s(t)>v \Rightarrow g(t-1)+s(t)-v=0+10-5=5 \Rightarrow$$
$$g(t)=\text{Max}(5,0)=5$$

Second sample: |s1−s2|=10=s(t), $$s(t)>v \Rightarrow g(t-1)+s(t)-v=5+10-5=10 \Rightarrow$$
$$g(t)=\text{Max}(10,0)=10$$

Third sample: g(t)=15; Fourth sample: g(t)=20 . . .
End of calculation example two.

Third Calculation Example, Altitude, No Summation
s1=10, s2=12
v=5 m;
s1 and s2 differ less than v, i.e.
First sample: |s1−s2|=2=s(t), $$s(t) < v \Rightarrow g(t-1) + s(t) - v = 0 + 2 - 5 = -3 \Rightarrow$$
$$g(t) = \text{Max}(-3, 0) = 0$$

End of calculation example three.

Figure 2A:
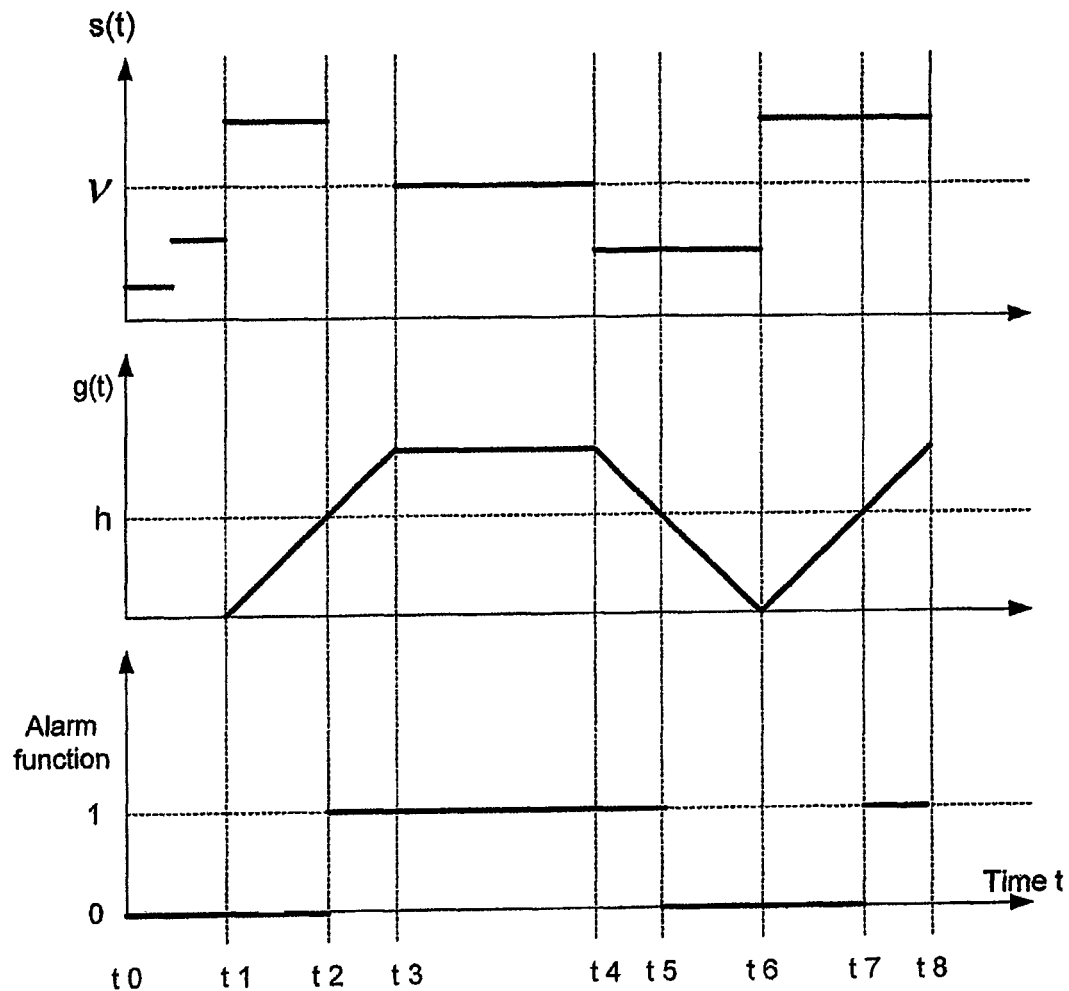
FIG. 2a schematically illustrates three graphs depicting different aspects of the algorithm according to the present invention.

FIG. 2a schematically illustrates three graphs depicting different aspects of the algorithm.

It is illustrated in FIG. 2a how the accumulative sum g(t) is built up during a time period extending from a time point t1 to a time point t3 depending upon various values s(t). There is also shown that an alarm signal is generated at a time point t2, namely when the function g(t) is equal to a predetermined threshold value h. When an absolute value of the signal difference between first signal s1 and a second signal s2 is reduced to a level below v, at a time point t4, the function g(t) gets a down slope. When the function s(t) again reaches the threshold value h, at a time point t5, the alarm function is again zero, i.e. the alarm is shut off. It should be noted that the alarm is ON if g(t)>h, according to this embodiment. If an alarm function has a value 1, the alarm is ON, as indicated in FIG. 2.

At a time point t6 the function g(t) again starts to increase resulting in a second alarm at a time point t7. This example only illustrates how the three graphs varies until a time point t8.

Figure 2B:
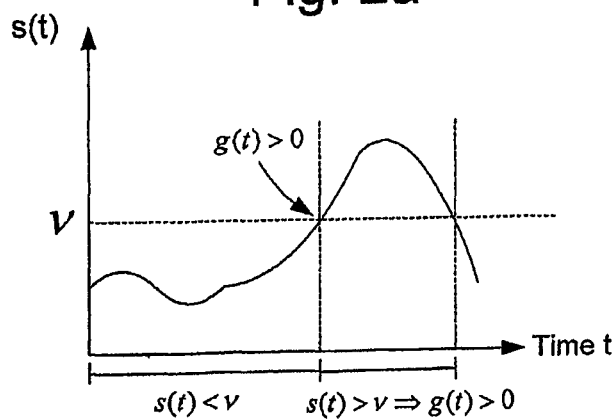
FIG. 2b schematically illustrates a graph depicting an aspect of the algorithm according to the present invention.

FIG. 2b schematically illustrates s(t) as a function of time t. The graph also depicts certain conditions relating to s(t).

Figure 3A:
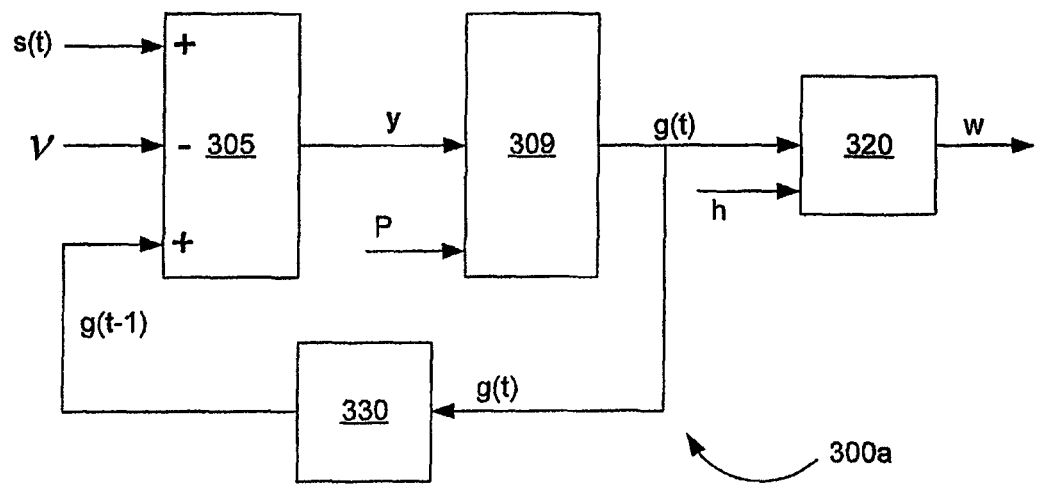
FIG. 3a schematically illustrates a circuit according to an aspect of the present invention.

FIG. 3a depicts a circuit 300a according to a most simple aspect of the invention. According to this embodiment the data processing unit 100 comprises the circuit 300a.

The circuit 300a comprises an adder 305 which is arranged to receive an absolute value s(t) representing the absolute value of signals 380a and 380b from the sensors 110 and 120 (shown in FIG. 1b) corresponding to a certain time t. These signals are also referred to as s1(t) and s2(t) or only s1 and s2. The adder 305 is arranged to a receive the absolute value s(t) on a first input. The adder 305 is arranged to receive the drift value v on a second input. The adder 305 is arranged to a receive a value g(t−1) on a third input.

The adder is arranged to calculate a value y, namely (g(t−1)+s(t)−v). The adder is arranged to output the value y on a first output.

The sum value y is subsequently sent to a maximum value determining unit 309. The maximum value determining unit 309 is arranged to receive the value y and perform a matching procedure involving the received value y and a predetermined value P. In this case the predetermined value P is zero (0). The maximum value determining unit 309 is adapted to choose a larger value of y and P, i.e. to choose a larger value of (g(t−1)+s(t)−v) and 0. The maximum value determining unit 309 is arranged to output the larger of y and P. The output value from the maximum value determining unit 309 is referred to as g(t). The maximum value determining unit 309 is further arranged for communication with a delay unit 330 and a comparator 320. The maximum value determining unit 309 is arranged to output the value g(t) to both the delay unit 330 and the comparator 320.

The comparator 320 is arranged to receive the value g(t) and to compare g(t) with the predetermined threshold value h. The comparator 320 is arranged to generate an alarm signal w depending upon a result of the comparison process involving the values g(t) and w. According to a preferred embodiment the comparator 320 is arranged to generate the alarm signal w if the value g(t) is strictly larger than the threshold value h. According to an alternative embodiment the comparator 320 is arranged to generate the alarm signal w if the value g(t) is strictly larger than or equal with the threshold value h. The comparator 320 is arranged to output the generated alarm signal w. The alarm signal w is also referred to as warning signal w.

The delay unit 330 is arranged to receive the value g(t) and to delay an outputting of the value g(t) with a certain time period Tdelay. The delay unit 330 is arranged to delay g(t) by one sample. The time period Tdelay is thus depending on e.g. the frequency f. The delay unit 330 is provided so as to achieve accumulate summations.

After the delay period Tdelay has lapsed since reception of the value g(t), the value g(t) is outputted from the delay unit 330. At this moment, status of the value g(t) is changed to g(t−1). This means that the current value g(t) changed status to be a preceding value g(t−1). The delay unit 330 is arranged to output the value g(t−1). The value g(t−1) is subsequently inputted to the adder 305 on the third input.

The circuit 300a represents a simplest form of use, i.e. an embodiment which is the easiest to implement wherein characteristics are clearly represented, i.e. two variable signals, absolute difference between two variable signals, predetermined threshold value h with one design parameter and possible recovering/self healing.

Figure 3B:
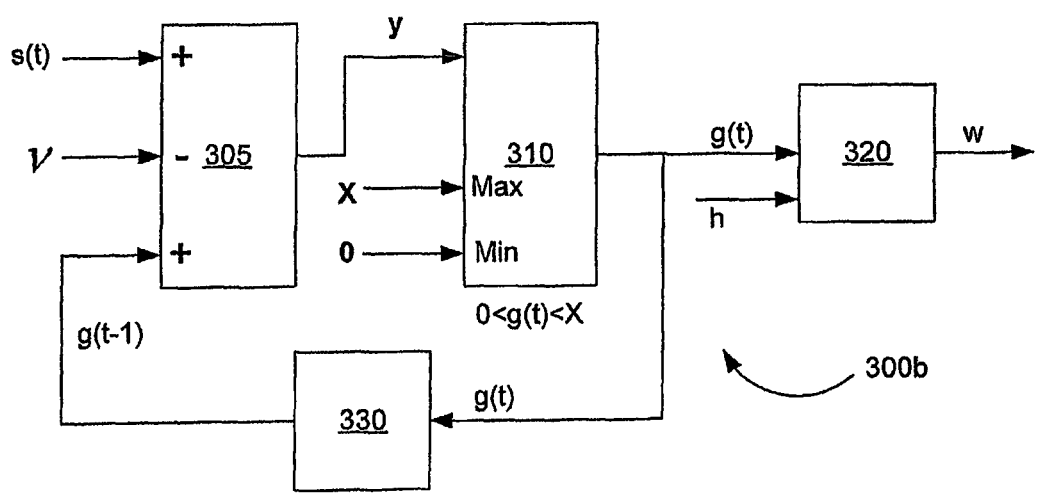
FIG. 3b schematically illustrates a circuit according to an aspect of the present invention.

FIG. 3b depicts a circuit 300b according to an aspect of the invention. According to this embodiment the data processing unit 100 comprises the circuit 300b. The circuit 330b comprises substantially the same units as depicted with reference to FIG. 3a, i.e. the units of circuit 300a. However, the maximum value determining unit 309 is replaced with a limiter 310. The limiter 310 is arranged to receive the value y and perform a matching procedure involving the received value y(t) and a predetermined value P. In this case the predetermined value P is zero (0) as indicated in the FIG. 3b. The limiter 310 is adapted to choose a larger value of y(t) and P, i.e. to choose a larger value of (g(t−1)+s(t)−v) and 0. Also, the limiter 310 is arranged to limit the chosen value g(t) or P to a predetermined value X if the chosen value y(t) or P exceeds X. The limiter 310 is arranged to output the larger of the chosen value y(t) or P, or X if the chosen value y(t) or P exceeds X. The output from the limiter is referred to as g(t). The limiter is thus arranged to limit an output of the limiter to a value not exceeding the value of X. The limiter 310 is further arranged for communication with the delay unit 330 and the comparator 320. The limiter 310 is arranged to output the larger of value g(t) or P, or X if the chosen value y(t) or P exceeds X, to both the delay unit 330 and a comparator 320. The outputted value from the limiter 310 is referred to as g(t).

An advantage is that for each sample when s(t)>v, y(t) will grow. If s(t) is much larger than v, y(t) will grow fast. If y(t) is not limited, it might take a very long time for a recovered system to reduce g(t) so that a warning can recover/self heal. That would worsen system availability.

Figure 3C:
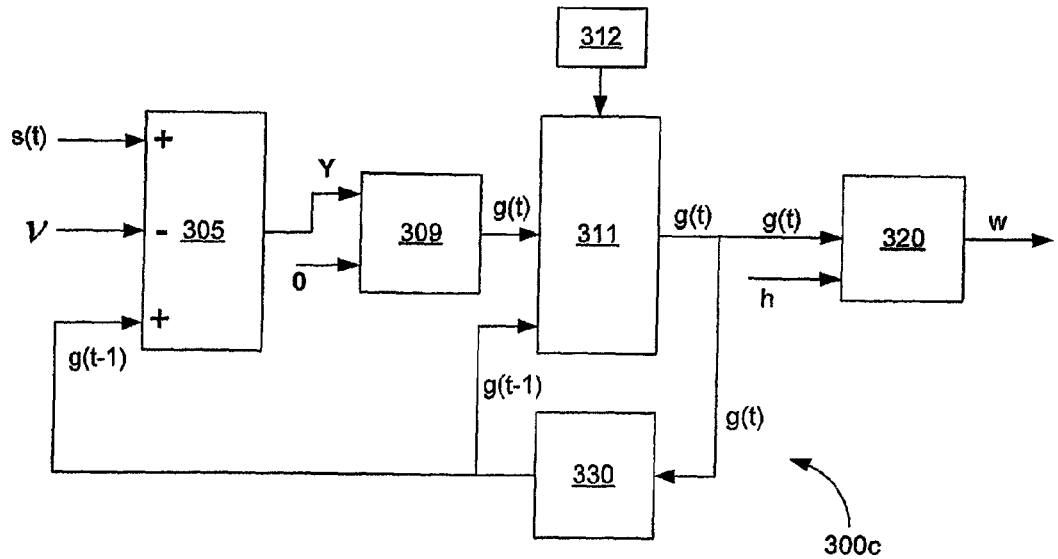
FIG. 3c schematically illustrates a circuit according to an aspect of the present invention.

FIG. 3c depicts a circuit 300c according to an aspect of the invention. The circuit 300c comprises the adder 305, the maximum value determining unit 309, a selector 311, the comparator 320 and the delay unit 330 as illustrated in FIG. 3c.

The delay unit 330 is arranged for communication with the selector 311. The delay unit 330 is arranged to input the value g(t−1) to the selector 311.

The selector 311 is also arranged to receive the value g(t) from the maximum value determining unit 309. The means 312 is arranged to command ON/OFF. If logic for deciding whether to monitor or not says not, last good value is hold. These because monitoring can be turned off due to flight state where bad inputs are expected. If the monitor would precede to summarize g(t) and only the warning signal w would be turned off, the system could have added too much signal noise to g(t) so that a warning would be raised when condition for monitoring would be equal to on again. The sensitization means 312 is arranged for communication with the selector 311. The sensitization means 312 is also referred to sensitization logics 312.

An advantage of this embodiment is the possibility to have logic to decide when to monitor and not, i.e. there might be conditions when it is not important to monitor data. One such case is for example during air-to-air refueling or transonic.

Figure 3D:
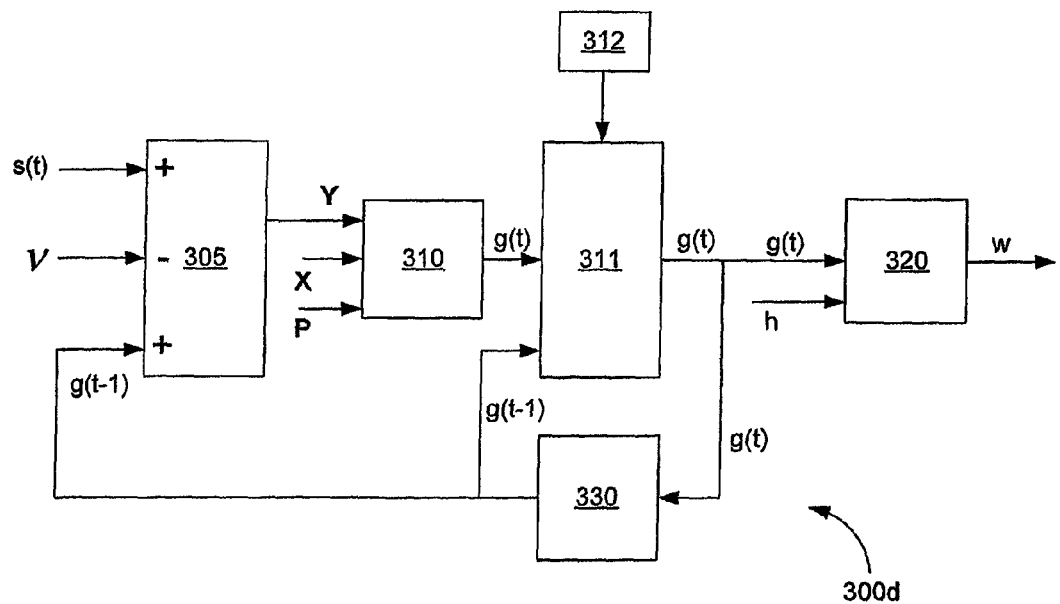
FIG. 3d schematically illustrates a circuit according to an aspect of the present invention.

FIG. 3d depicts a circuit 300d according to an aspect of the invention. According to this embodiment the circuit 300d of the invention is provided with a set up of units comprising the adder 305, limiter 310, selector 311, sensitization means 312, delay unit 330, and comparator 320. The respective functions and purposes of the units of the circuit 300d is depicted with reference to FIGS. 3a-3c.

This setup improves ability for recovering/self healing (limiter 310) and logic for deciding when it is preferable to monitor or not. Also, the system is easy to implement.

Figure 3E:
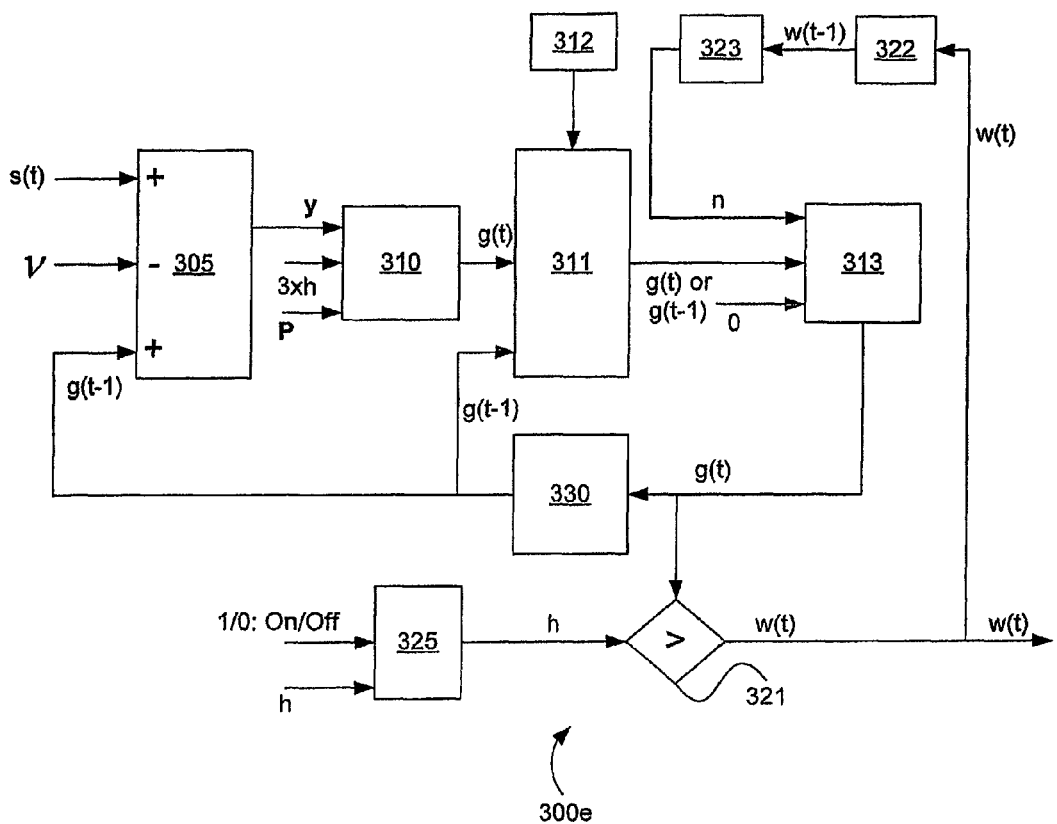
FIG. 3e schematically illustrates a circuit according to an aspect of the present invention.

FIG. 3e depicts a circuit 300e according to an aspect of the invention.

The circuit 300e comprises adder 305 as depicted above. The circuit further comprises a limiter 310, which in this embodiment is arranged to limit an output g(t) to 3*h. This limiting function makes a self-healing of the algorithm possible in a convenient way. Alternatively, the output g(t) can be an arbitrary value.

The limiter 310 is arranged to send the value g(t) to a selector 311 which is arranged to select the value g(t) if the sensitization means 312 is providing a value 1 to the limiter 312. The selector 311 is arranged to select a value g(t−1) provided from a delay unit 330 if the sensitization means 312 is providing a value 0 to the selector 311. The limiter 311 is arranged to output a selected value g((t) or g(t−1) to a selector 313.

The selector 313 is arranged to select the received value if a provided value n is set to 1. Alternatively the selector 313 is arranged to select the value 0 if a provided value n is set to 0.

The selector 313 is arranged to output the selected value to a comparator 321. The comparator 321 is arranged to compare the received value outputted from the selector 313. The comparator is arranged to generate a warning signal w(t) if the received value g(t) is equal or larger than h. The selector 313 is arranged to allow to set an output to zero in case of for example a so called touch down of a platform in the form of an airplane. In this sense a touch down is placed on a par of a completed landing.

The selector 313 is arranged to output the selected value to a delay unit 330. The delay unit 330 is arranged to delay the received value g(t) during a predetermined time period. The delay unit 330 is also arranged to change status of the received value to become a value g(t−1). The delay unit is also arranged to output the value g(t−1) to the selector 311. The delay unit 330 is also arranged to output the value g(t−1) to the adder 305.

Holding means 325 is arranged for communication with the comparator 321. Holding means 325 is arranged for implementing a choice of the threshold value h. If the selector 311 is selecting a 0 causing the value g(t−1) to be looped, a corresponding threshold value h also is looped so as not to generate an invalid warning signal w.

The comparator 321 is arranged for communication with a delay unit 322. The comparator 321 is arranged to send the warning signal w(t) to the delay means 322. The delay means is arranged to change status of the received value w(t) to become a value w(t−1). The delay unit 322 is also arranged to output the value w(t−1) to a deciding means 323.

The deciding means 323 is arranged to generate a decision. The deciding means is arranged to output a value n to the selector 313 depending upon said decision. The value of n is equal 1 at normal performance of the circuit. The value of n is equal 0 if the circuit is to be reset.

The deciding means 323 is arranged to decide when to set system to zero by using logic such as and, or, not on signals of interest.

Normalization: (h−g(t))/h. According to FIG. 3e g(t) maximum value is limited to 3h. Minimum value is 0. According to this a normalized output has a range [−2 . . . 1]. ((h−3h)/h=−2 and (h−0)/h=1). When 1 is the outcome the system is well functional, when outcome is below zero the system raises a warning w and when −2 the sum g(t) has reached is maximum value.

Figure 4A:
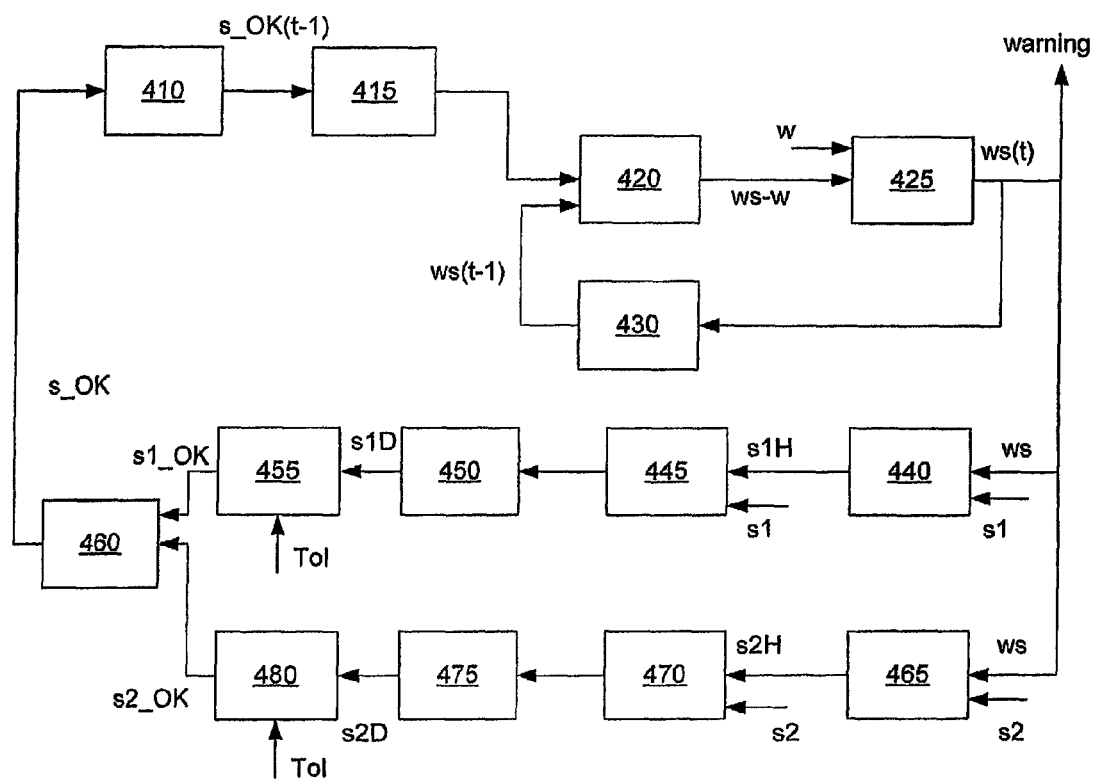
FIG. 4a schematically illustrates a circuit according to an aspect of the present invention.

FIG. 4a depicts a circuit according to an aspect of the invention.

An OR-means 425 is arranged to receive a warning signal w on a first input and a signal value ws_w on a second input. The warning signal w is generated by any of the circuits 300a-300e according to an aspect of the invention. The value ws is a warning signal associated with self-healing. The OR-means 425 is arranged to output a warning signal ws. The OR-means is arranged to send the warning signal ws to a delay unit 430. The delay unit 430 is arranged to delay the warning signal ws a predetermined time period. The delay unit 430 is arranged to change status of the warnings signal ws to become a warning signal ws(t−1). The delay unit 430 is arranged to send the warning signal ws(t−1) to a second input of an AND-means 420. The OR-means is arranged to send the warning signal ws to both a first holding means 440 and a second holding means 465.

The first holding means 440 is arranged to hold the provided signal s1 in case of reception of the warning signal ws. The first holding means is arranged to output a signal s1H to a subtraction means 445.

The subtraction means 445 is arranged to calculate a difference between the provided signal s1H and the first signal s1 and to output a result to another calculation means 450. The calculation means 450 is arranged to determine an absolute value of the outputted difference between the signal s1H and the first signal s1. The calculation means 450 is further arranged to output the absolute value as a signal s1D to a determining unit 455.

The determining unit 455 is arranged to determine if the signal s1 has changed over needed tolerance for declare signal OK. The determining unit 455 is arranged to output a signal s1_OK if s1D>Tol. The signal s1_OK is outputted to an AND-means 460.

Similar processing is performed with reference to the units 465, 470, 475 and 480. However, the processing performed by the units 465, 470, 475 and 480 is regarding the second signal s2. The determining unit 480 is arranged to output the signal s2_OK is outputted to the AND-means 460.

The AND-means 460 is arranged to send an output signal s_OK. Both signals must be considered ok before recovering/self healing is permitted. The AND-means 460 is arranged to send the output signal s_OK to a delay unit 410. The delay unit 410 is arranged to delay the signal s_OK a predetermined time period. The delay unit 410 is arranged to change status of the signal s_OK to become a signal s_OK(t−1). The delay unit

410 is arranged to send the signal s_OK(t−1) to a NOT-means 415. If the output of the NOT-means is 0, the arrangement according to FIG. 4a can self-heal, if no warning signal is provided to the OR means 425.

The warning signal ws has to have been applied during a foregoing sample to allow a self-healing principle of the arrangement.

Figure 4B:
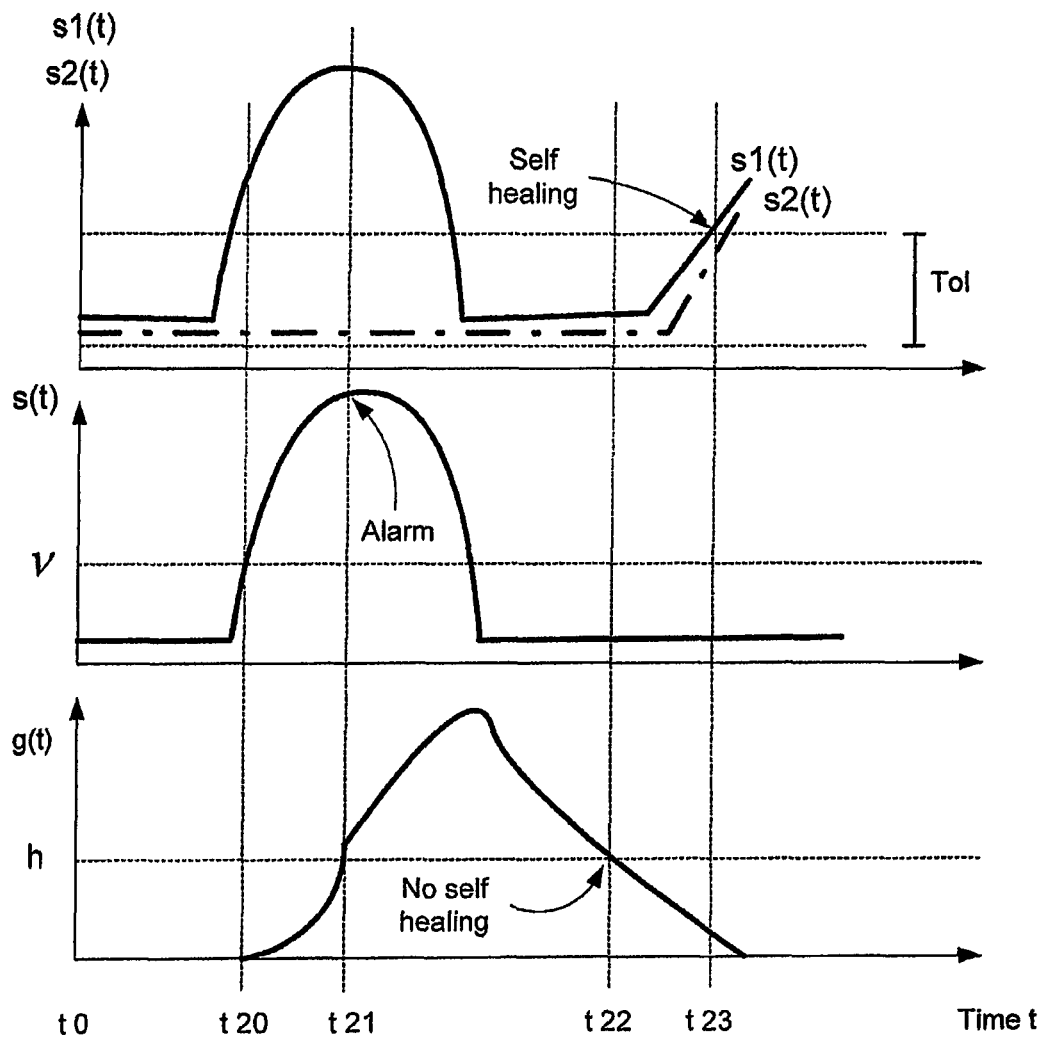
FIG. 4b schematically illustrates three graphs depicting different aspects of the algorithm according to the present invention.

List of Definitions, Referring to in Particular FIG. 4a
w: warning signal;
ws: warning signal associated with self healing;
s1: signal 1, originating from first data generating means 110;
s2: signal 1, originating from first data generating means 120;
s1H: signal 1, locked if ws=Tol;
s2H: signal 2, locked if ws=Tol;
s1D: absolute signal difference s1H−s1;
s2D: absolute signal difference s2H−s2;
s1_OK: If s1D>Tol, then ok to self heal;
s2_OK: If s2D>Tol, then ok to self heal;
s-OK: If both s1_OK and s2_OK, implies self-healing;
Tol: tolerance value. i.e. a value that each of the signals s1 and s2 must have moved to allow self-healing;
ws_w: ws dependent on that the warning can not heal.
End of list of definitions FIG. 4b depicts three graphs relating to self-healing of the algorithm according to an aspect of the invention.

It is shown that two signals s1(t) and s2(t) to be monitored initially, i.e. within a tome period between a time point t0 and t20 does not differ substantially. However, before the time point t20 the first signal s1(t) start to register larger values, thus increasing a value of the absolute difference between the first signal s1(t) and the second signal s2(t).

As depicted above an alarm signal is generated if the accumulating sum g(t) exceeds a predetermined threshold value h. According to this example this happens at a time point t21.

It is shown that the signals s1(t) and s2(t) again start to register about the same magnitude of a parameter of interest, i.e. they are not deviating substantially from each other. According to this embodiment there is no self healing of the algorithm even if the function g(t) reaches a level below the predetermined threshold value h at a time point t22. However, if the signals s1(t) and s2(t) does not deviate more than a predetermined value during a predetermined time period, the alarm function is set to zero (0), i.e. the alarm signal w is not generated after that time point. In the graph this is represented at a time point t23. This self-healing provides the positive effect that the algorithm according to the invention is more reliable.

One positive advantage according to this embodiment is that system availability is increased.

Figure 5A:
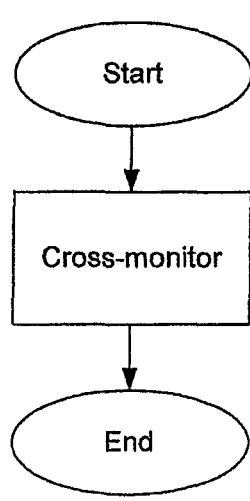
FIG. 5a schematically illustrates a flow chart depicting a method for improved cross-monitoring of system safety critical primary data according to an aspect of the present invention.

Tol is the required value of which signal must have changed to be considered ok to recover/self heal FIG. 5a schematically illustrates a method for cross-monitoring data, such as flight critical data.

The method comprises a first method step s501.

In the method step s501 a cross-monitoring step according to the invention. The method step s501 comprises the steps of:
calculating a value depending upon a signal value, drift value and a feedback value;
determining a larger one of the calculated value and a first predetermined value;
comparing said determined larger value with a second predetermined value;
delaying said determined larger value and change status of said larger value to become an updated feedback value to be used is a next calculation step of the value;
characterized by
calculating the signal value depending upon an absolute value of the difference between the two independent signals.
After the method step s501 the method ends.

Preferably the method comprises the step of:
outputting a warning signal if said determined larger value (g(t)) is equal or larger than the second predetermined value.
Preferably the method comprises the step of:
limiting the determined larger value of the calculated value and the first predetermined value to a predetermined value.
Preferably the method comprises the step of:
selecting a phase of looping the updated feedback value so as to provide the updated feedback value in a predetermined manner.
Preferably the method comprises the step of:
not outputting the alarm signal if a predetermined criterion is met.
Preferably the predetermined criterion is defined by that a predetermined number of generated values are less than the threshold value during a predetermined time period.
Preferably the method comprises the step of:
predetermining the drift value.
Preferably the method comprises the steps of:
calculating the absolute value of the difference between the to independent signals;
and
inputting the calculated absolute value.
Preferably the method comprises the step of:
generating each of the two independent generated signals by a separate sensor.
After the method step s501 the method ends.

Figure 5B:
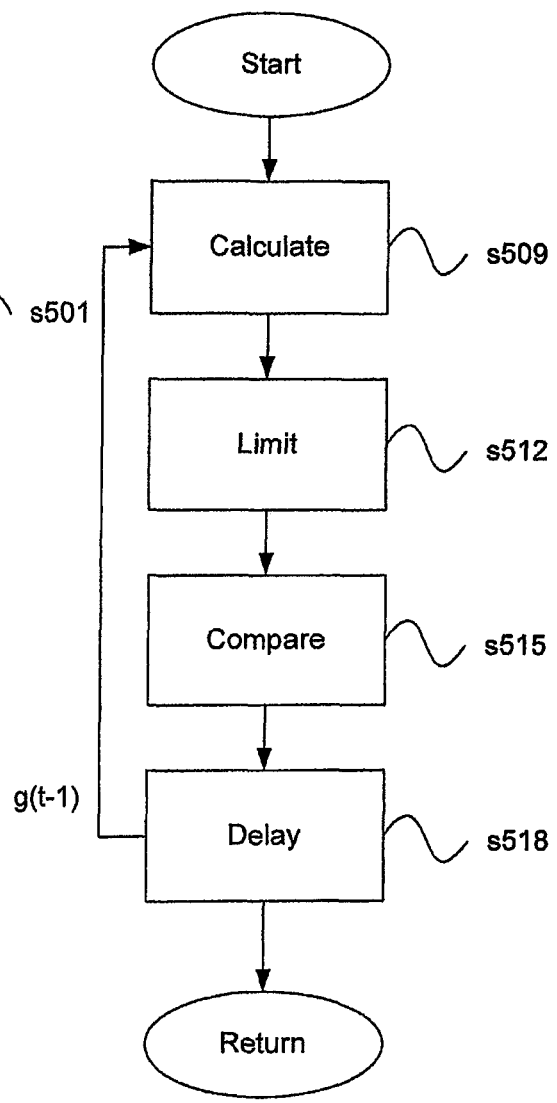
FIG. 5b schematically illustrates in greater detail a flow chart depicting a method for improved cross-monitoring of system safety critical primary data according to an aspect of the present invention.

FIG. 5b schematically illustrates a method for cross-monitoring of data depicted in greater detail.

The method comprises a first method step s509. The method step s509 comprises the steps of:
calculating an absolute value s(t) of the signal difference between a first signal s1(t) and a second signal s2(t);
receiving values s(t), v, and g(t−1), where g(t−1) is zero (0) for a first iteration;
generating a sum value y(t)=s(t)−v+g(t−1)
outputting the value y(t).
After the method step s509 a subsequent method step s512 is performed.

The method step s512 comprises the steps of:
receiving the value y(t);
changing status of the value y(t) to become a value g(t);
limiting the value g(t) to a predetermined value X, if the value g(t) is larger than the value X;
outputting the value g(t).
After the method step s512 a subsequent method step s515 is performed.

The method step s515 comprises the steps of:
receiving the outputted value g(t);
comparing the received value g(t) with a predetermined threshold value h;
generating a warning signal w if the received value g(t) is equal or larger than the predetermined threshold value h; and
outputting the generated warning signal w.
After the method step s515 a subsequent method step s518 is performed.

The method step s518 comprises the steps of:
receiving the outputted value g(t);
delaying an output time point of the value g(t);
changing status of the value g(t) to become a value g(t−1);
outputting the value g(t−1) for use in the method step s509 allowing to calculate a new value y(t) based on updated values s(t) and v.

The method is performing these steps until a need thereof is fulfilled. This method is depicted with reference to the circuit illustrated with reference to FIG. 3b. Corresponding methods may of course be depicted with reference to any of the FIGS. 3a-3e, FIG. 4 and FIG. 7.

Figure 6:
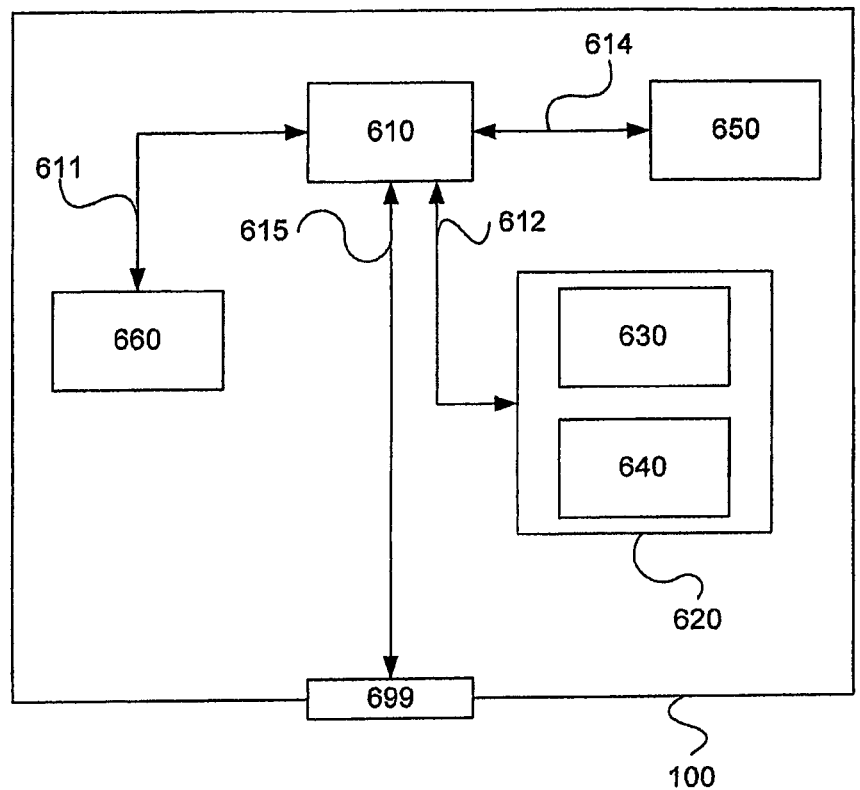
FIG. 6 schematically illustrates a data processing unit according to an aspect of the invention.

With reference to FIG. 6, a diagram of one embodiment of the apparatus 100 is shown. Any of the units depicted with reference to e.g. FIG. 7 below may comprise the apparatus 100. Apparatus 100 comprises a non-volatile memory 620, a data processing device 610 and a read/write memory 650. Non-volatile memory 620 has a first memory portion 630 wherein a computer program, such as an operating system, is stored for controlling the function of apparatus 100. Further, apparatus 100 comprises a bus controller, a serial communication port, I/O-means, an A/D-converter, a time date entry and transmission unit, an event counter and an interrupt controller (not shown). Non-volatile memory 620 also has a second memory portion 640.

A computer program comprising routines for cross-monitoring of data, such as critical flight data, which data is generated by two separate independent sensors according to the invention. The program may be stored in an executable manner or in a compressed state in a separate memory 660 and/or in read/write memory 650.

When it is stated that data processing device 610 performs a certain function it should be understood that data processing device 610 performs a certain part of the program which is stored in separate memory 660, or a certain part of the program which is stored in read/write memory 650.

Data processing device 610 may communicate with a data port 699 by means of a data bus 615. Non-volatile memory 620 is adapted for communication with data processing device 610 via a data bus 612. Separate memory 660 is adapted to communicate with data processing device 610 via a data bus 611. Read/write memory 650 is adapted to communicate with data processing device 610 via a data bus 614.

When data is received on data port 699 it is temporarily stored in second memory portion 640. When the received input data has been temporarily stored, data processing device 610 is set up to perform execution of code in a manner described above. According to one embodiment, data received on data port 699 comprises information such as input signals provided by the sensors 110 and 120. This information can be used by apparatus 100 so as to cross-monitor the set of sensors comprising the independent sensors 110 and 120.

Parts of the methods described herein can be performed by apparatus 100 by means of data processing device 610 running the program stored in separate memory 660 or read/write memory 650. When apparatus 100 runs the program, parts of the methods described herein are executed.

An aspect of the invention relates to a computer programme comprising a programme code for performing the method steps depicted with reference to FIGS. 5a and 5b, respectively, when the computer programme is run on a computer.

An aspect of the invention relates to a computer programme product comprising a program code stored on computer-readable media for performing the method steps depicted with reference to FIGS. 5a and 5b, respectively, when the computer programme is run on the computer.

An aspect of the invention relates to a computer programme product directly storable in an internal memory of a computer, comprising a computer programme for performing the method steps depicted with reference to FIGS. 5a and 5b, respectively, when the computer programme is run on the computer.

Figure 7:
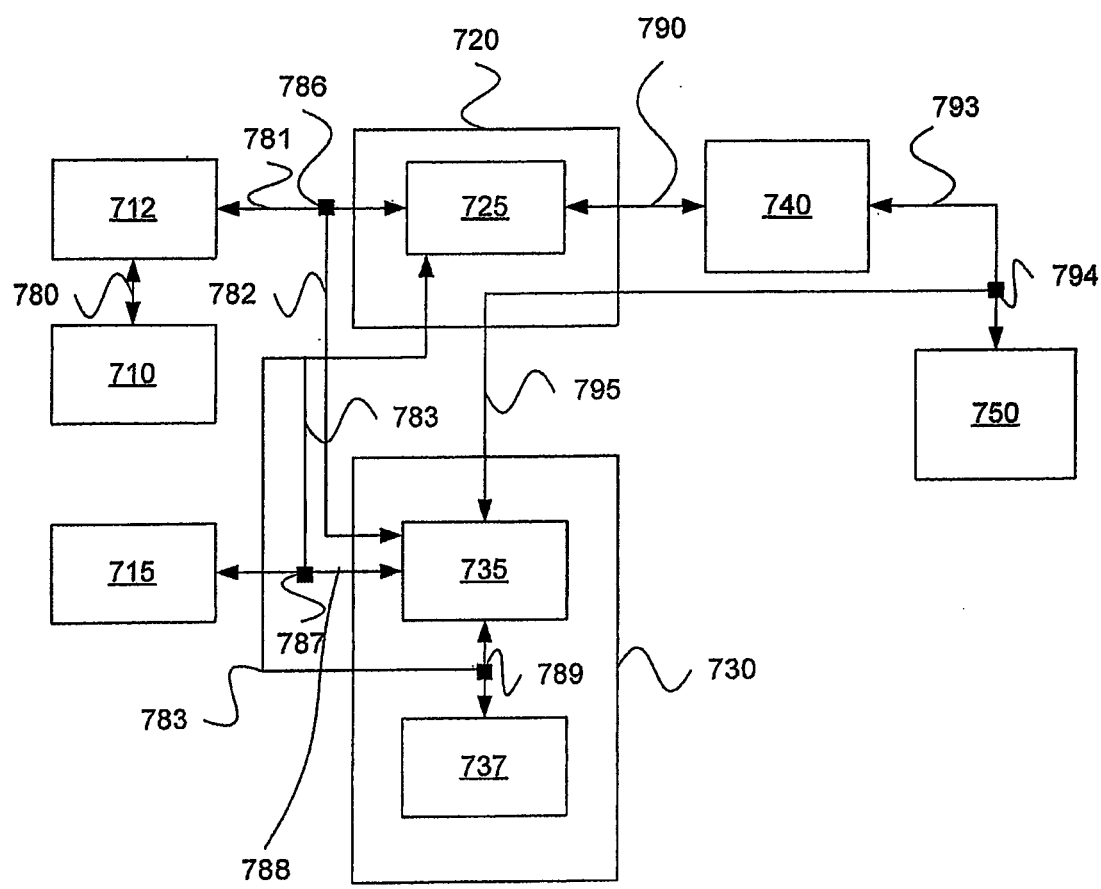
FIG. 7 schematically illustrates a system overview of a platform based sub-system for cross-monitoring of data according to an aspect of the present invention.

FIG. 7 schematically illustrates a system overview of a platform based sub-system for cross-monitoring of data.

To monitor to pilot displayed system safety critical data requires that data integrity are ensured by system safety. RTCA-DO-178B is a software standard used in matters of system safety. Problem is that to ensure highest ranking, level A, there is an extended need of verification and testing which is more costly. Commonly software is developed to level C. (level A-E). Need for data capacity when performing monitoring with video recordings mean raised costs for flying system due to equipment needed, overall system capacity.

When performing monitoring as described in circuit, there is no need for raised software level for all functions to ensure data integrity. Also the method merely echoes data, which do not require much more capacity of the system as if the monitoring would be performed by video recording data and image processing. Also data sources must be monitored to be considered correct to ensure the correctness of the displayed data. This because displayed data is monitored against source.

When echo data from displays to monitoring system, via other subsystems, these subsystems must not be developed to fulfil RTCA-DO-178B Level A. Also calculations performed before data is displayed must not be performed by a unit developed to Level A (circuit 725). This solution can be applicable to already existing design and together with sensor monitoring fulfil requirements for a well functional cross-monitoring system for flight safety critical data.

An inertial navigation system 710 is arranged for communication with a first air data computer 712 via a link 780. The first air computer 712 is arranged for communication with a systems computer 720. In particular the first air computer 712 is arranged for communication with a data processing device 725 via a link 781. The first air computer 712 is also arranged for communication with a flight control system 730.

The flight control system 730 comprises a cross-monitoring unit 735 and an altitude/heading reference system 737. In particular the first air computer 712 is arranged for communication with the cross-monitoring unit 735 via a link 782. The link 782 is connected to the link 781 at a point 786. The altitude/heading reference system 737 is arranged for communication with the cross-monitoring unit 735 via a link 789.

A second air data computer 715 is arranged for communication with the flight control system 730. In particular the second air data computer 715 is arranged for communication with the cross-monitoring unit 735 via a link 788.

The systems computer is arranged for communication with an electronic display system 740 via a link 790.

The electronic display system 740 is arranged for communication with a head up display provided in a cockpit of the platform 10.

S/W developed to LEVEL C according to RTCA-DO-178B (740 and 720).
S/W developed to LEVEL A according to RTCA-DO-178B 730
Reason for not implement all code to meet Level A is because it is more time consuming, requires extended verification and testing.

The system which is depicted with reference to FIG. 7 has the advantage that an improved cross-monitoring of flight parameter data is achieved. Flight parameter data could be preliminary flight safety data, e.g. altitude. The flight parameter data is actually displayed on the display unit 750 and also cross-monitored according to the architecture of the system. It is in many ways advantageous to provide the displayed signal to the cross-monitoring unit 735.

Thus, two cross-monitoring functions are provided. The cross-monitoring unit 735 is arranged to perform a cross-monitoring process involving the signals s1(t) and s2(t) as depicted with reference to for example FIGS. 3a-3e. Also, the cross-monitoring unit 735 is arranged to perform a cross-monitoring process involving the signals s1(t) and a processed signal s1(t), namely s*1(t). Synergetic effects of this double functioning are achieved, such as providing a more reliable cross-monitoring system.

According to an aspect of the invention there is provided a system for cross monitoring of flight data within a platform, the system comprising:

first signal generating means for generating a first signal, wherein said first means is arranged to send the first signal to a data processing means; and second signal generating means for generating a second signal, wherein said second means is arranged to send the second signal to a flight control means comprising a cross-monitoring unit;

wherein the data processing means is arranged to process said first signal and send a third signal to an electronic display means which is arranged to output the third signal to a display unit to be displayed for an operator of the platform, wherein the system is characterized in that said electronic display means further is arranged to send said third signal to the cross-monitoring unit; and wherein said cross-monitoring unit is arranged to perform a processing step of said first signal and said third signal so as to cross-monitor said first and second signal generating means.

Preferably said electronic display means further is arranged to send said third signal to the cross-monitoring unit via said data processing means.

Preferably said first signal generating means is arranged to send the first signal to the cross-monitoring unit for allowing a comparison procedure involving the first signal and the third signal.

Preferably the flight control means is security certified for a level higher than both the data processing means and the electronic display means.

According to an aspect of the invention there is provided a platform comprising a system as depicted with reference to FIG. 7, wherein said first and second signal comprises substantially simultaneously measured values relating to one operating parameter, wherein the operating parameter is chosen from a group comprising altitude A of a platform, calibrated airspeed CV of a platform, speed MS of a platform measured in Mach, pitch value TV of a platform, roll value RV of a platform, true heading TH of a platform and magnetic course MC of a platform.

The platform is chosen from a group comprising airplane, space craft, satellite, helicopter, robot, missile or ground vehicle, water craft or underwater craft, e.g. an automobile, ship or submarine.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An arrangement for cross monitoring two independent generated signals, the arrangement comprising:
   a first calculating unit configured to calculate a value depending upon a signal value, drift value and a feedback value, wherein the signal value comprises information about an absolute value of a difference between the two independent generated signals;
   a determining unit configured to determine a larger one of the calculated value and a first predetermined value after calculation of the calculated value;
   a comparing unit configured to compare said determined larger value with a second predetermined value after determining the larger one of the calculated value and the first predetermined value; and
   a delaying unit configured, after comparing said determined larger value with the second predetermined value, to delay said determined larger value and change status of said larger value to become an updated feedback value to be provided to the calculating unit configured to calculate the value;
   wherein the comparing unit is arranged to output a warning signal if said determined larger value is equal to or larger than the second predetermined value so as to indicate that the independent signals differ too much from each other relative the second predetermined value.

2. The arrangement according to claim 1, wherein the determining unit is further arranged to limit the determined larger value of the calculated value and the first predetermined value to a predetermined value.

3. The arrangement according to claim 1, further comprising:
   a selecting unit configured to select a phase of looping the updated feedback value is arranged to receive the updated feedback value from the delaying unit and to receive the determined larger value from the determining unit.

4. The arrangement according to claim 1, wherein the second predetermined value depends upon a preset constant time, a preset constant frequency, and a difference of a parameter value and the drift value.

5. The arrangement according to claim 1, wherein the second predetermined value is a threshold value that depends upon different platform modes.

6. The arrangement according to claim 1, wherein the drift value is a predetermined design parameter value that determines an amount of noise to be suppressed relative to deviation of the two generated signals.

7. The arrangement according to claim 1, further comprising:
   a second calculating unit configured to calculate an absolute value of the difference between the to independent signals arranged to input a calculated absolute value to the second calculating unit.

8. The arrangement according to claim 1, wherein each of the two independent signals is generated by a separate independent sensor, and wherein the drift value is a predetermined design parameter value that determines an amount of noise to be suppressed relative to deviation of the two independent signals.

9. The arrangement according to claim 1, wherein said first and second signal comprises substantially simultaneously measured values relating to one operating parameter.

10. The arrangement according to claim 9, wherein the operating parameter is chosen from a group comprising altitude of a platform, calibrated airspeed of a platform, speed of a platform measured in Mach, pitch value TV of a platform, roll value of a platform, true heading of a platform and magnetic course of a platform.

11. A platform comprising an arrangement according to claim 1, wherein the platform is chosen from a group comprising airplane, space craft, satellite, helicopter, robot, missile or ground vehicle, water craft or underwater craft.

12. A method for cross monitoring two independent signals within a platform, the method comprising the following steps carried out in the following order:
calculating a value depending upon a signal value, a drift value and a feedback value;
determining a larger of the calculated value and a first predetermined value;
comparing said determined larger value with a second predetermined value;
delaying said determined larger value and change status of said larger value to become an updated feedback value to be used is a next calculation step of the value;
calculating the signal value depending upon an absolute value of the difference between the two independent signals; and
outputting based on the comparison a warning signal if said determined larger value is equal to or larger than the second predetermined value so as to indicate that the independent signals differ too much from each other relative the second predetermined value.

13. The method according to claim 12, further comprising:
limiting the determined larger value of the calculated value and the first predetermined value to a predetermined value.

14. The method according to claim 12, further comprising:
selecting a phase of looping the updated feedback value so as to provide the updated feedback value in a predetermined manner.

15. The method according to claim 12 further comprising: not outputting the alarm signal if a predetermined criterion is met.

16. The method according to claim 15, wherein the predetermined criterion is defined by that a predetermined number of generated values are less than the threshold value during a predetermined time period.

17. The method according to claim 12, further comprising: predetermining the drift value.

18. The method according to claim 12, further comprising:
calculating the absolute value of the difference between the to independent signals; and
inputting the calculated absolute value.

19. The method according to claim 12, further comprising:
generating each of the two independent generated signals by a separate sensor.

20. A computer program product, comprising:
a non-transitory computer readable medium; and
computer program instructions recorded on the computer readable medium and executable by a processor to carry out a method for cross monitoring two independent signals within a platform, the method comprising the following steps carried out in the following order
calculating a value depending upon a signal value, a drift value and a feedback value,
determining a larger of the calculated value and a first predetermined value,
comparing said determined larger value with a second predetermined value,
delaying said determined larger value and change status of said larger value to become an updated feedback value to be used is a next calculation step of the value,
calculating the signal value depending upon an absolute value of the difference between the two independent signals, and
outputting based on the comparison a warning signal if said determined larger value is equal to or larger than the second predetermined value so as to indicate that the independent signals differ too much from each other relative the second predetermined value.

21. The computer program product according to claim 20, wherein the method is carried out iteratively, and wherein the feedback value is 0 for a first iteration of the method.

22. The computer program product according to claim 21, wherein the method further comprises:
calculating a value including the signal value plus the feedback value minus the drift value;
changing a status of the sum value to a feedback value; and
limiting the value of the feedback value to a predetermined value if the value of the feedback value is larger than the predetermined value.

23. The computer program product according to claim 22, further comprising:
changing a status of the status of the feedback value to an updated feedback value; and
utilizing the updated feedback value to calculate a new sum value.

24. The arrangement according to claim 1, wherein the arrangement is configured to iteratively carry out the calculating, determining, comparing, and delaying, and wherein the feedback value is 0 for a first iteration of the method.

25. The arrangement according to claim 24, wherein
the calculating unit is further configured to calculate a value including the signal value plus the feedback value minus the drift value,
the delaying unit is further configured to change a status of the sum value to a feedback value, and
the determining unit is further configured to limit the value of the feedback value to a predetermined value if the value of the feedback value is larger than the predetermined value.

26. The arrangement according to claim 25, wherein
the delaying unit is further configured to change a status of the status of the feedback value to an updated feedback value, and
the calculating unit is further configured to utilize the updated feedback value to calculate a new sum value.

27. The method according to claim 12, wherein the method is carried out iteratively, and wherein the feedback value is 0 for a first iteration of the method.

28. The method according to claim 27, further comprising:
calculating a value including the signal value plus the feedback value minus the drift value;
changing a status of the sum value to a feedback value; and
limiting the value of the feedback value to a predetermined value if the value of the feedback value is larger than the predetermined value.

29. The method according to claim 28, further comprising:
changing a status of the status of the feedback value to an updated feedback value; and
utilizing the updated feedback value to calculate a new sum value.

* * * * *